US007967276B2

(12) United States Patent
Tsung

(10) Patent No.: US 7,967,276 B2
(45) Date of Patent: Jun. 28, 2011

(54) QUICK JOINT FOR CONNECTING GAS CYLINDER AND PRESSURE REDUCING VALVE FOR GAS STOVE

(76) Inventor: Kao-Hsung Tsung, Taipei (TW)

( * ) Notice: Subject to any disclaimer, the term of this patent is extended or adjusted under 35 U.S.C. 154(b) by 555 days.

(21) Appl. No.: 12/219,790

(22) Filed: Jul. 29, 2008

(65) Prior Publication Data

US 2010/0025607 A1 Feb. 4, 2010

(51) Int. Cl.
*F16K 51/00* (2006.01)

(52) U.S. Cl. ........................................ 251/144; 251/142

(58) Field of Classification Search .................. 251/142, 251/149, 144, 148; 220/582; 137/577, 590
See application file for complete search history.

(56) References Cited

U.S. PATENT DOCUMENTS 3,918,678 A * 11/1975 Rechtsteiner et al. ........ 251/144
5,160,117 A * 11/1992 Besombes ..................... 251/144
5,330,154 A * 7/1994 Mashburn et al. ............ 251/144
6,669,167 B2 * 12/2003 Lin ............................... 251/144
6,948,698 B1 * 9/2005 Scott et al. .................... 251/148

* cited by examiner

*Primary Examiner* — John K Fristoe, Jr.
(74) *Attorney, Agent, or Firm* — Bacon & Thomas, PLLC

(57) ABSTRACT

The present invention discloses a quick joint for connecting gas cylinder and pressure reducing valve for gas stove, and the quick joint includes a connecting ring having a through hole, and arc brackets extended from the periphery of the connecting ring and encircled into a ring shape, and each arc bracket includes a positioning groove for installing a spring clamp. When the quick joint is operated, a connecting ring is installed between the pressure reducing valve and the middle of a joint pipe of the pressure reducing valve, and the pressure reducing valve is sheathed onto the gas cylinder, and a spring clamp is used for loosening and binding the connecting ring for installing or removing a screw type pressure reducing valve and a push-button type gas cylinder, and thus providing a safe and quick use.

4 Claims, 4 Drawing Sheets

QUICK JOINT FOR CONNECTING GAS CYLINDER AND PRESSURE REDUCING VALVE FOR GAS STOVE

BACKGROUND OF THE INVENTION

1. Field of the Invention

The present invention relates to a quick joint for connecting gas cylinder and pressure reducing valve for gas stove.

2. Description of the Related Art

Indoor hot pots or outdoor barbeques generally require using a portable gas cylinder. There are two common specifications of portable gas cylinders available in the market. The first one is a screw type gas cylinder 1 as shown in FIG. 1, wherein a thread 2 disposed at the mouth of the screw type gas cylinder 1 is screwed with a screw type pressure reducing valve 3. The second one is a push-button type gas cylinder 4 as shown in FIGS. 2 and 3, wherein a positioning ring 5 is installed at the mouth of the push-button type gas cylinder 4, and a push-button type pressure reducing valve 6 is pressed and latched at the positioning ring 5 for connecting and fixing the push-button type pressure reducing valve 6 onto the push-button type gas cylinder 4. At present, most of the pressure reducing valves used in the gas cylinder are screw type pressure reducing valves 3, and the pressure reducing valve is screwed and connected to a screw type gas cylinder 1 as shown in FIG. 1, and this type of screw type pressure reducing valve 3 cannot be used directly on a push-button type gas cylinder 4, and thus causing tremendous inconvenience to manufacturers and users.

Due to the general light, thin, short and compact requirements of the portable gas cylinder for a convenient carry, the distance between the portable gas cylinder and the stove is short, and thus resulting in a limited operating space for the installation. Users usually have to place the portable cylinder horizontally or slantlingly before using the gas cylinder. However, the pressure in the gas cylinder becomes larger in this case, and the fuel gas may spray out easily due to the large pressure, which creates a safety issue.

To prevent the fuel gas from spraying out, an L-shaped pipe 7 in the gas cylinder is installed at a notch 8 of a positioning ring 5 of the gas cylinder and corresponding to the L-shaped pipe 7, so that when the gas cylinder is placed horizontally or slantingly according to the direction of the notch 8, the opening of the L-shaped pipe 7 in the gas cylinder faces upward to step down the discharge pressure of the gas cylinder when the gas cylinder is filled up with fuel gas. This arrangement should be taken into consideration for the design of the joint assembly between the gas cylinder and the pressure reducing valve.

Therefore, the inventor of the present invention developed a quick joint for connecting gas cylinder and pressure reducing valve for gas stove, such that a screw type pressure reducing valve can be installed to or removed from a push-button type gas cylinder. The quick joint goes with the design of the notch 8 of the gas cylinder to remind users to install the L-shaped pipe with its opening facing upward.

SUMMARY OF THE INVENTION

It is a primary objective of the invention to provide a quick joint for connecting gas cylinder and pressure reducing valve for gas stove, such that a screw type pressure reducing valve can be installed to a push-button type gas cylinder directly and quickly, and users are reminded of the correct and safe direction of disposing the gas cylinder.

To achieve the foregoing objective, the present invention provides a quick joint for connecting gas cylinder and pressure reducing valve for gas stove, wherein a through hole is disposed on a connecting ring and corresponding to a joint pipe at the lower end of the pressure reducing valve, and a plurality of arc brackets are extended from the periphery of the connecting ring in the direction of a positioning ring of the gas cylinder, and the arc brackets are encircled into a ring shape and each arc bracket includes a positioning groove for installing a spring clamp.

In an embodiment, four arc brackets are installed equidistantly along the periphery of the connecting ring for a better elasticity, and the plurality of positioning grooves are substantially in an arc shape or a U-shape.

The spring clamp is substantially in a circular shape, and features a simple structure and a low manufacturing cost. In the embodiment, both ends of the spring clamp are overlapped with each other, and each of the distal ends of the spring clamp has a clip ear, such that when the two clip ears are clamped, the diameter of the circular spring clamp can be expanded. After the clip ears are loosened, the diameter of the circular spring clamp returns to its original size due to the resilience of the spring clamp. Therefore, the resilience of the spring clamp can press the plurality of arc brackets into a ring shape, when the spring clamp is installed at the connecting ring. In the embodiment, the shape of the two clip ears can be circular, sheet-like shape or any shape that facilitates the clamping of the clip ears.

To conform to a label on the gas cylinder and prevent an L-shaped pipe in the gas cylinder from being placed upside down. In an embodiment, a stop block is disposed between two arc brackets of the connecting ring and embedded into a safety notch of the gas cylinder to remind users to place the gas cylinder in a correct direction.

With the foregoing structure, the spring clamp is installed at the plurality of positioning grooves to sheath the connecting ring, and the connecting ring is installed between the pressure reducing valve and the joint pipe of the pressure reducing valve, such that after the stop block is aligned with the safety notch of the push-button type gas cylinder, and the two clip ears are clamped, the circular spring clamp is spread open to loosen the clamping of the plurality of arc brackets. Now, the pressure reducing valve is sheathed onto the gas cylinder, and the connecting ring is pressed to displace the plurality of arc brackets behind the positioning ring of the gas cylinder, so that the stop block is embedded into the safety notch. After the connecting ring is attached with the gas cylinder, the two clip ears are loosened, and the spring clamp resumes to its original position and size due to the resilience, and the plurality of arc brackets clamp the rear of the positioning ring of the gas cylinder, while completing the connection of the screw type pressure reducing valve and the push-button type gas cylinder.

During the foregoing installation process, it is necessary to embed the stop block of the connecting ring into the safety notch for attaching the gas cylinder, and thus it reminds users to place the gas cylinder in a correct direction, such that the mouth of the L-shaped pipe of the gas cylinder faces upward.

Compared with the prior art, the quick joint of the invention is comprised of a connecting ring and a spring clamp, and thus users simply need to press the spring clamp to complete the installation or removal of the screw type pressure reducing valve and the push-button type gas cylinder, and the screw type pressure reducing valve can be used in a screw type gas cylinder and a push-button type gas cylinder anytime. With the design of the stop block, users are reminded about the correct direction of placing the gas cylinder, so that the present invention can provide a safe and convenient way of the use.

DETAILED DESCRIPTION OF THE PREFERRED EMBODIMENT

The present invention is illustrated in details by a preferred embodiment together with its related drawings as follows.

Figure 1:
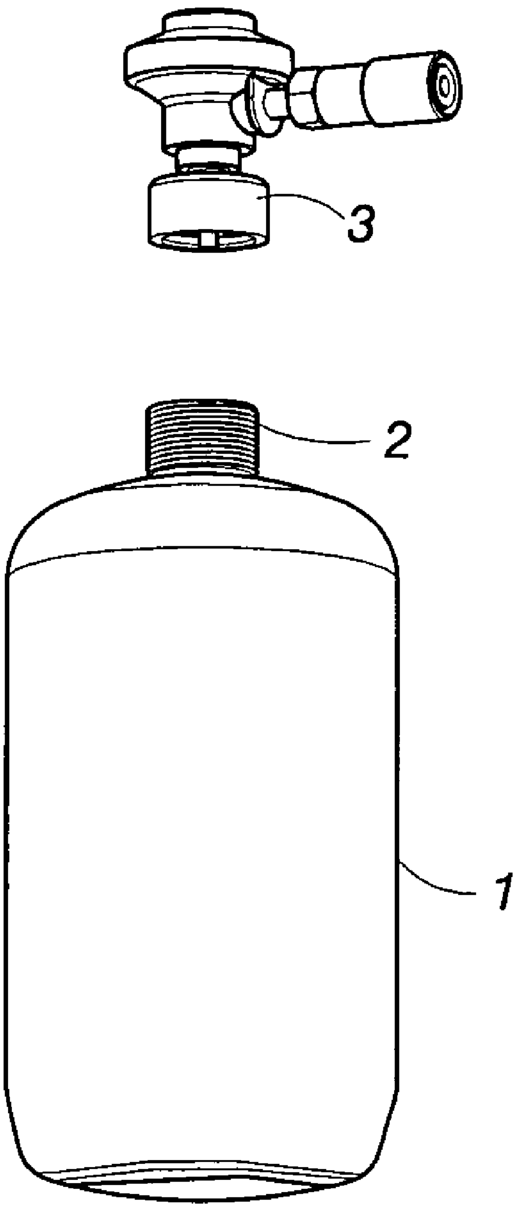
PRIOR ART FIG. 1
FIG. 1 is a perspective view of a conventional screw type gas cylinder.
Figure 2:
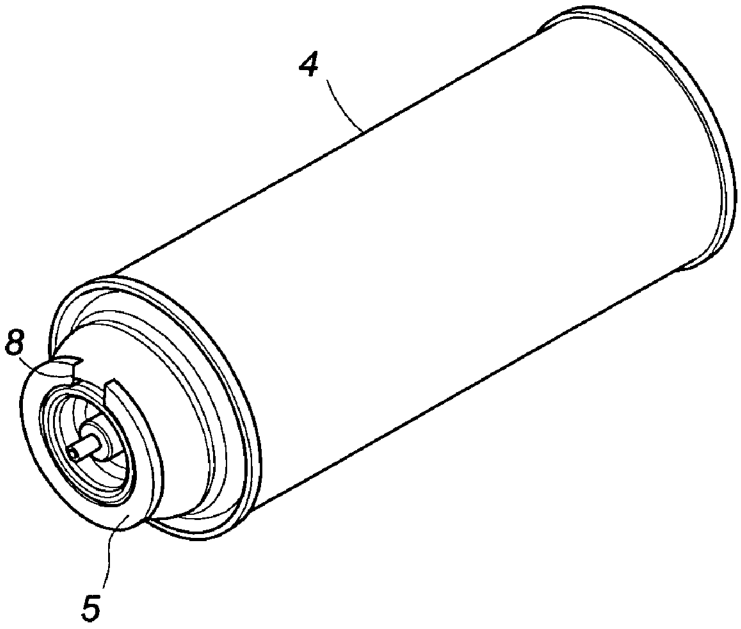
PRIOR ART FIG.2
FIG. 2 is a perspective view of a conventional push-button type gas cylinder.
Figure 3:
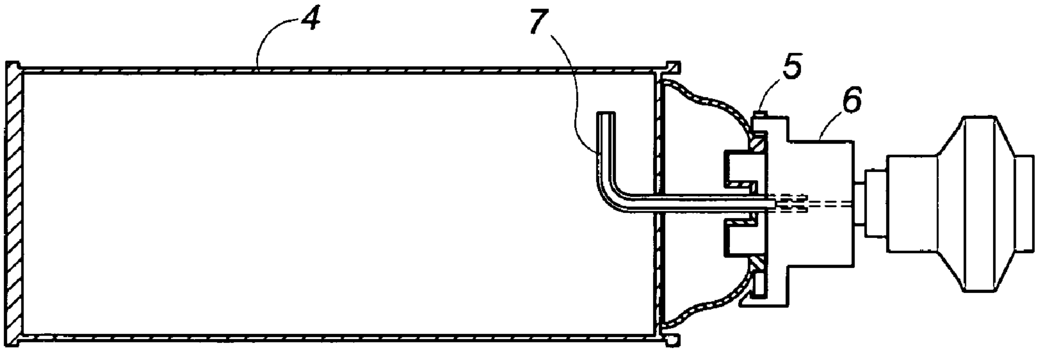
PRIOR ART FIG.3
FIG. 3 is a cross-sectional view of a conventional push-button type gas cylinder.
Figure 4:
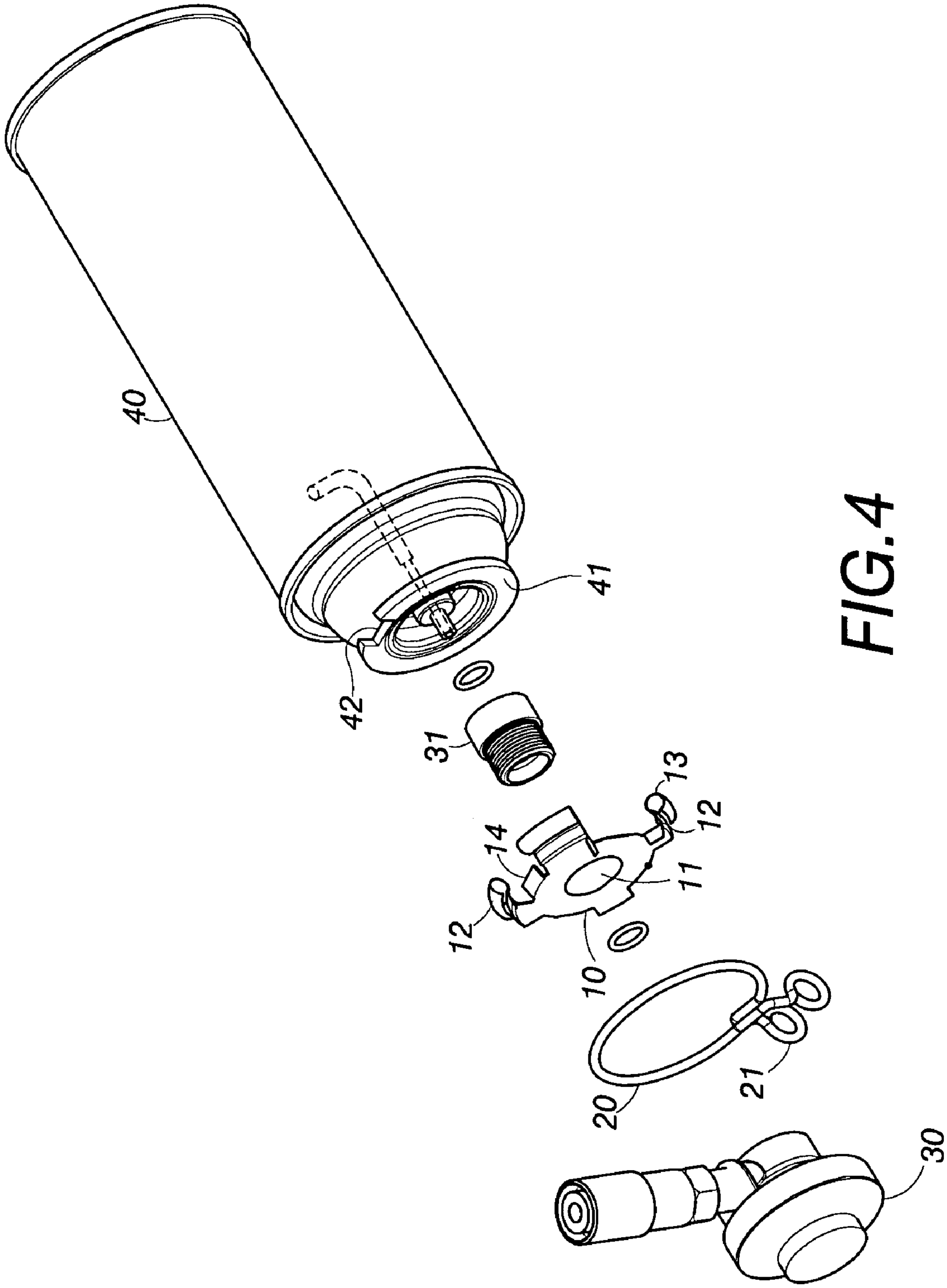
FIG. 4 is an exploded view of a preferred embodiment of the present invention.
Figure 5:
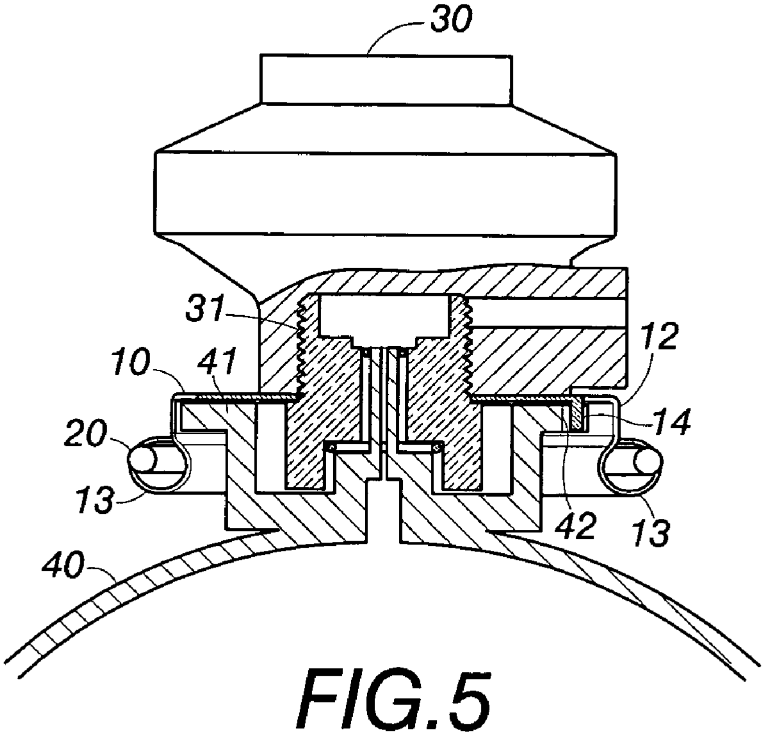
FIG. 5 is a cross-sectional view of an installing assembly in accordance with a preferred embodiment of the present invention.
Figure 6:
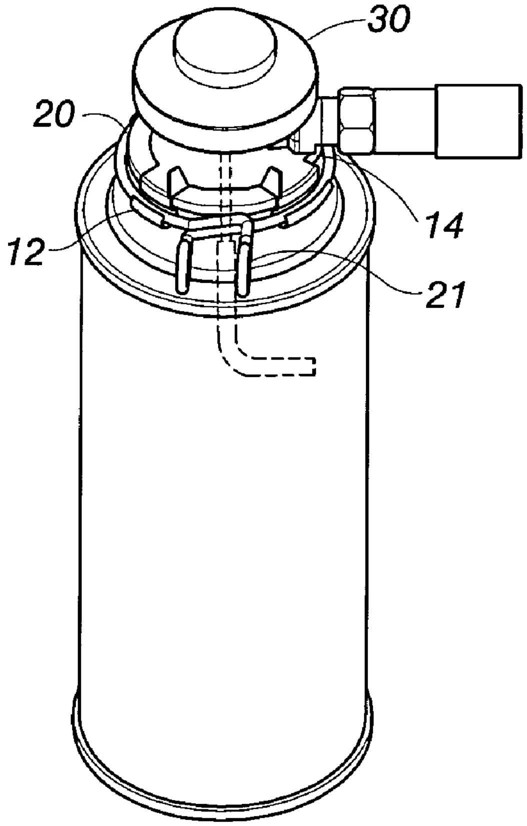
FIG. 6 is a schematic view of installing a quick joint to a pressure reducing valve in accordance with a preferred embodiment of the present invention.

In FIGS. 4 to 6, a quick joint for connecting gas cylinder and pressure reducing valve for gas stove in accordance with the present invention comprises a connecting ring 10 and a spring clamp 20 installed on the connecting ring 10, such that the connecting ring 10 and the spring clamp 20 can be used for installing/removing the pressure reducing valve 30 to/from a gas cylinder 40.

The connecting ring 10 includes a through hole 11 disposed at the middle of the connecting ring 10 and corresponding to a joint pipe 31 at the lower end of the pressure reducing valve 30, and the connecting ring 10 includes a plurality of arc brackets 12 extended from the periphery of a positioning ring 41 of a gas cylinder 40, and encircled into a ring shape, and each arch bracket 12 has a positioning groove 13 for installing a spring clamp 20. In an embodiment, four arc brackets 12 are disposed equidistantly around the connecting ring 10 to obtain a better resilience, and the plurality of positioning grooves 13 are substantially in an arc shape or a U-shape.

The spring clamp 20 is substantially in a circular shape, and comes with a simple structure and a low manufacturing cost. In an embodiment, both ends of the spring clamp 20 are overlapped, and a clip ear 21 is disposed separately on both ends of the spring clamp 20 for clamping the two clip ears 21 to expand the diameter of the circular spring clamp 20. After the two clip ears 21 are loosened, the circular spring clamp 20 returns to its original diameter and size due to the resilience, so that when the spring clamp 20 is installed at the connecting ring 10, the resilience of the spring clamp 20 can press the plurality of arc brackets 12 into a circular shape. In the embodiment, the shape of the two clip ears 21 can be circular, sheet-like shape or any shape that can facilitates the pressing of the clip ears.

To conform to a label on the gas cylinder 40 and prevent an L-shape pipe in the gas cylinder 40 from being placed upside down, a stop block 14 is disposed between two arc brackets 12 of the connecting ring 10 and embedded into a notch of the gas cylinder 40, so that users can place the gas cylinder 40 in the correct direction.

With the foregoing structure, if the spring clamp 20 is installed at the plurality of positioning grooves 13 and sheathed onto the connecting ring 10, and the connecting ring 10 is installed between the pressure reducing valve 30 and a joint pipe 31 of the pressure reducing valve 30, so that after the stop block 14 is aligned with the safety notch 42 of the push-button type gas cylinder 40 and the two clip ears 21 are clamped, the circular spring clamp 20 is spread open to loosen the clamping of the plurality of arc brackets 12. Now, the pressure reducing valve 30 is sheathed onto the gas cylinder 40 and pressed at the connecting ring 10 to displace the plurality of arc brackets 12 behind the positioning ring 41 of the gas cylinder 40, so that after the stop block 14 is embedded into the safety notch 42 and the connecting ring 10 is attached to the gas cylinder 40, the two clip ears 21 are loosened, and the spring clamp 20 resumes its original position and size due to resilience to clamp the plurality of arc brackets 12 behind the positioning ring 41 of the gas cylinder 40, while completing the connection of the screw type pressure reducing valve 30 and the push-button type gas cylinder 40.

In the foregoing installation process, it is necessary to embed the stop block 14 of the connecting ring 10 into the safety notch 42 for attaching the gas cylinder 40, so as to remind users to place the gas cylinder 40 in a correct direction and keep the opening of the L-shaped pipe of the gas cylinder 40 to face upward.

While the invention has been described by means of specific embodiments, numerous modifications and variations of structure, means and characteristic could be made thereto by those skilled in the art without departing from the scope and spirit of the invention set forth in the claims.

What is claimed is:

1. A quick joint for connecting gas cylinder and pressure reducing valve for gas stove, comprising:

- a connecting ring, installed between the pressure reducing valve and a joint pipe of the pressure reducing valve;
- a spring clamp, installed on the connecting ring, and having a through hole disposed at the middle of the connecting ring and corresponding to the joint pipe at a lower end of the pressure reducing valve;
- a plurality of arc brackets, extended from the periphery of the connecting ring towards the positioning ring of the gas cylinder, and encircled into a ring shape, and each arc bracket having a positioning groove for installing a spring clamp, and the resilience of the spring clamp clamping the plurality of arc brackets to the rear of the positioning ring of the gas cylinder, while connecting a screw type pressure reducing valve and a push-button type gas cylinder.

2. The quick joint for connecting gas cylinder and pressure reducing valve for gas stove of claim 1, wherein four arc brackets of the connecting ring are disposed equidistantly from each other on the connecting ring.

3. The quick joint for connecting gas cylinder and pressure reducing valve for gas stove of claim 1, wherein the spring clamp has two ends with a portion overlapped with each other, and a clip ear is disposed at a rear end of the overlapped portion.

4. The quick joint for connecting gas cylinder and pressure reducing valve for gas stove of claim 1, wherein the positioning ring of the gas cylinder includes a safety notch, and a stop block disposed between two arc brackets of the connecting ring and with respect to the safety notch.

* * * * *